United States Patent
Hosotani

(10) Patent No.: US 9,859,798 B2
(45) Date of Patent: Jan. 2, 2018

(54) WIRELESS POWER-FEEDING APPARATUS

(71) Applicant: MURATA MANUFACTURING CO., LTD., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/477,837

(22) Filed: Apr. 3, 2017

(65) Prior Publication Data
US 2017/0207706 A1    Jul. 20, 2017

Related U.S. Application Data

(63) Continuation of application No. PCT/JP2015/074328, filed on Aug. 28, 2015.

(30) Foreign Application Priority Data

Nov. 17, 2014  (JP) .................... 2014-232860

(51) Int. Cl.
*H02J 5/00* (2016.01)
*H02M 3/22* (2006.01)
(Continued)

(52) U.S. Cl.
CPC .............. *H02M 3/22* (2013.01); *H02J 5/005* (2013.01); *H02J 50/12* (2016.02); *H02M 3/07* (2013.01);
(Continued)

(58) Field of Classification Search
CPC ........... H02J 5/005; H02J 50/12; H02J 7/025; H02M 3/335; H02M 3/33523;
(Continued)

(56) References Cited

U.S. PATENT DOCUMENTS 4,964,158 A * 10/1990 Okochi ................. H02M 1/38
                                                    323/266
9,178,438 B2 * 11/2015 Fu ..................... H02M 3/33576
(Continued)

FOREIGN PATENT DOCUMENTS

| JP | 2002-345241 A | 11/2002 |
| JP | 5321758 B2 | 10/2013 |
| WO | 2012/101907 A1 | 8/2012 |

OTHER PUBLICATIONS

International Search Report issued in PCT/JP2015/074328; dated Nov. 2, 2015.
(Continued)

*Primary Examiner* — Gary L Laxton
(74) *Attorney, Agent, or Firm* — Studebaker & Brackett PC

(57) ABSTRACT

A switching control circuit alternately turns on/off, at a switching frequency at which the impedance of a multi-resonant circuit becomes inductive, switching elements with a dead time therebetween. In an operation in the third quadrant of current-voltage characteristics of the switching elements, the switching elements are turned on by supplying a control signal to control terminals of the switching elements, and a dead time is determined so as to satisfy $tc \leq td < (tc+ta)$, tc representing a commutation period in which the voltages across both ends of the switching circuits change, ta representing a period corresponding to the operation in the third quadrant, and td representing the dead time.

17 Claims, 7 Drawing Sheets

(51) Int. Cl.
  *H02M 3/07*   (2006.01)
  *H02M 3/337*  (2006.01)
  *H02J 50/12*  (2016.01)
  H02M 3/335    (2006.01)
  H01F 38/14    (2006.01)
  H02M 1/00     (2006.01)

(52) U.S. Cl.
  CPC ..... *H02M 3/3376* (2013.01); *H01F 2038/146* (2013.01); *H02M 2001/0058* (2013.01)

(58) Field of Classification Search
  CPC ......... H02M 3/33553; H02M 3/33569; H02M 2007/4815; Y02B 70/1433; Y02B 70/1416
  See application file for complete search history.

(56) References Cited

U.S. PATENT DOCUMENTS

| | | | |
|---|---|---|---|
| 2013/0300210 A1 | 11/2013 | Hosotani | |
| 2013/0301308 A1 | 11/2013 | Hosotani | |
| 2016/0056639 A1* | 2/2016 | Mao | H02J 50/80 307/104 |
| 2017/0149285 A1* | 5/2017 | Ushijima | H02J 50/12 |

OTHER PUBLICATIONS

Written Opinion issued in PCT/JP2015/074328; dated Nov. 2, 2015.
International Preliminary Report on Patentability issued in PCT/JP2015/074328; dated May 23, 2017.

* cited by examiner

WIRELESS POWER-FEEDING APPARATUS

CROSS REFERENCE TO RELATED APPLICATIONS

This application claims benefit of priority to Japanese Patent Application 2014-232860 filed Nov. 17, 2014, and to International Patent Application No. PCT/JP2015/074328 filed Aug. 28, 2015, the entire content of which is incorporated herein by reference.

TECHNICAL FIELD

The present disclosure relates to a wireless power-feeding apparatus that wirelessly feeds power using electromagnetic resonance phenomenon via an electromagnetic coupling circuit including a power transmission coil and a power reception coil.

BACKGROUND

A switching power source using electromagnetic resonance phenomenon is described in Japanese Patent No. 5321758. The switching power source in Japanese Patent No. 5321758 includes a switching control circuit that generates an alternating-current (AC) voltage by alternately turning on and off switching elements with a dead time therebetween.

SUMMARY

Technical Problem

Recently, market demands for smaller and lighter electronic devices and for increased efficiency of switching power supply circuits have been rising more. In general, it is important to increase the accuracy of switching control in order to increase the efficiency of a switching power supply circuit. However, hardly anything has been made clear about a switching control technique in a technical field called high-frequency power electronics in which an operating frequency is in a MHz band, and about a sophisticated switching control technique for obtaining a high power conversion efficiency in the case where a new power semiconductor, specifically a compound (GaN: gallium nitride, GaAs: gallium arsenide, SiC: silicon carbide) semiconductor, a special power semiconductor element, or the like is used. For example, in the case where a power GaN semiconductor is used in a wireless power-feeding apparatus, hardly anything has been made clear so far about what technique for adjusting a dead time may reduce the conduction loss and the switching loss in a switching element, may reduce the amount of heat generated in the switching element, and may improve the power conversion efficiency of the apparatus. In particular, in the case where a compound semiconductor is used as the switching element, hardly anything has been made clear about techniques for making good use of its current-voltage characteristics different from those of a typical silicon (Si: silicon) semiconductor in order to obtain a high power conversion efficiency. Regarding a wireless power-feeding technology for feeding power through space from a power transmission unit to a power receiving unit, demand for an increase in efficiency and a reduction in size and weight is high, and development of a technique for controlling switching elements in order to obtain a high power conversion efficiency is an important technique involved in contribution to the advancement of science and technology.

The purpose of the present disclosure is to provide a wireless power-feeding apparatus that positively makes good use of electrical current-voltage characteristics specific to a power semiconductor element to further increase power conversion efficiency.

Solution to Problem

A wireless power-feeding apparatus according to the present disclosure is configured as in the following.

(1) A wireless power-feeding apparatus that wirelessly feeds power from a power transmission unit to a power receiving unit is characterized in that an electromagnetic coupling circuit that includes a power transmission coil on the power-transmission-unit side and a power reception coil on the power-receiving-unit side (the electromagnetic coupling circuit constituting an electromagnetic resonance circuit in which magnetic field coupling or electric field coupling is mixed, magnetic field coupling occurring using a mutual inductance occurring between the power transmission coil and the power reception coil, electric field coupling occurring using mutual capacitances), a power-transmission-side alternating-current voltage generating circuit that includes switching circuits constituted by parallel connection circuits including switching elements, equivalent diodes, and capacitors, the switching circuits being electrically connected to the power transmission coil, and that causes the power transmission coil to generate an alternating-current voltage from a direct-current voltage input by performing switching of the switching circuits, a switching control circuit that causes the power-transmission-side alternating-current voltage generating circuit to generate an alternating-current voltage having a square waveform or a trapezoidal waveform by alternately turning on/off the switching elements of the power-transmission-side alternating-current voltage generating circuit with a dead time therebetween, a power-reception-side rectifier circuit that rectifies the alternating-current voltage generated at the power reception coil to a direct-current voltage, a power-transmission-side resonance mechanism that is formed on the power transmission side and that includes a first resonance capacitor, and a power-reception-side resonance mechanism that is formed on the power reception side and that includes a second resonance capacitor.

The electromagnetic coupling circuit causes electric field energy or magnetic field energy to be exchanged between the power-transmission-side resonance mechanism and the power-reception-side resonance mechanism, the electromagnetic coupling circuit, the power-transmission-side resonance mechanism, and the power-reception-side resonance mechanism together constitute a multi-resonant circuit, and the switching control circuit performs switching of the switching elements of the power-transmission-side alternating-current voltage generating circuit (so that a current flowing into the multi-resonant circuit has a sine-wave-shaped resonance current waveform lagging behind an alternating-current voltage generated from the power-transmission-side alternating-current voltage generating circuit, and power is transmitted from the power transmission side to the power reception side in both on and off periods of the switching elements) at a switching frequency at which an impedance of the multi-resonant circuit becomes inductive, turns on the switching elements by supplying a control signal to control terminals of the switching elements in an operation in a third quadrant of current-voltage characteristics of the switching elements, and reduces both conduction loss and switching loss in the switching elements by determining the dead time so that tc≤td<tc+ta is satisfied, tc representing a commutation period in which voltages between both ends of the switching circuits change, ta representing a period in which the operation in the third quadrant is performed, td representing the dead time.

(2) It is preferable that the switching elements be compound semiconductor transistors having electric characteristics with which the magnitude of a reverse voltage is reduced in the operation in the third quadrant by supplying the control signal to the control terminals. This provides the following advantages.

The power loss may be significantly reduced in the operation in the third quadrant of current-voltage characteristics of the compound semiconductor transistors.

Both the conduction loss and the switching loss may be reduced in the compound semiconductor transistors by making good use of high-speed operation characteristics of the compound semiconductor transistors.

No antiparallel diode having a small forward voltage drop needs to be connected, thereby enabling a reduction in the number of components. Thus, it becomes possible to miniaturize the wireless power-feeding apparatus.

A compound semiconductor transistor generally has a small amount of gate charge, and thus the power loss may be reduced in the switching control circuit driving the compound semiconductor transistors.

(3) It is preferable that the power-transmission-side resonance mechanism or the power-reception-side resonance mechanism be structurally configured. This provides the following advantages.

The resonance mechanism may be simply configured, and the number of components may be reduced.

The wireless power-feeding system may be miniaturized.

(4) It is preferable that a first filter including an inductor component (Lfp) and a capacitor component (Cfp) be provided between the power-transmission-side alternating-current voltage generating circuit and the power-transmission-side resonance mechanism or a second filter including an inductor component (Lfs) and a capacitor component (Cfs) be provided between the power-reception-side resonance mechanism and the rectifier circuit. This provides the following advantages.

The presence of the filters may reduce the harmonic component of the waveform of the current flowing in the resonance mechanism.

Reduction of electromagnetic interference (EMI) may improve the electromagnetic compatibility (EMC) with other electronic devices.

The degree of interference from, for example, wireless communication devices may be reduced.

Adjustment of a characteristic impedance of a filter converts an impedance, and a current and a voltage appropriate for a load may be applied.

(5) It is preferable that the power transmission coil and the power reception coil be air-core coils (inductors). As a result, electromagnetic field coupling is formed using electromagnetic resonance phenomenon, and power may be wirelessly fed with a high efficiency. In addition, no iron core is necessary, and a power-feeding distance may be increased.

(6) It is preferable that the electromagnetic coupling circuit transmit power from the power transmission side to the power reception side using electric field coupling between the first resonance capacitor and the second resonance capacitor. With this configuration, between the first resonance capacitor and the second resonance capacitor, electric field coupling is formed using electrostatic induction phenomenon, and power may be wirelessly fed with a high efficiency. The degree of magnetic field expansion in space may be suppressed by positively making good use of electric field coupling in a wireless section, and magnetic substances used in magnetic field coupling or magnetic substances needed to take measures against unwanted emission, electromagnetic noise, and ripple reduction in the power transmission unit or the power receiving unit may be reduced or eliminated. As a result, the power transmission unit or the power receiving unit may be reduced in size. In addition, use of an electrode having a large area enables large-area power feeding, and thus the wireless power-feeding apparatus may be made thinner.

(7) It is preferable that the power receiving unit include an output-information transmission circuit that detects output information regarding an output of the power-receiving-unit-side rectifier circuit and that transmits the output information to the power-transmission-unit side, and the power transmission unit include an output-information reception circuit that receives the output information and a power-to-be-fed control circuit that controls, by controlling the power-transmission-side alternating-current voltage generating circuit in accordance with the output information, power to be fed. As a result, a current and a voltage appropriate for a load may be applied by controlling the power to be fed.

(8) It is preferable that the output-information transmission circuit be a circuit that transmits the output information in wireless communication, and the output-information reception circuit be a circuit that receives the output information in wireless communication. As a result, output power may be adjusted in an electrically insulating state on the transmission side.

(9) It is preferable that the output-information transmission circuit be a circuit that transmits the output information through conversion of an electrical signal into an optical signal, and the output-information reception circuit be a circuit that receives the output information through conversion of the optical signal into the electrical signal. As a result, output power may be adjusted in an electrically insulating state on the transmission side.

(10) For example, the switching circuits include a high-side switching circuit and a low-side switching circuit, and the switching control circuit, for example, uses pulse frequency modulation (PFM) control in which a switching frequency is changed at which the high-side switching circuit and the low-side switching circuit are alternately turned on/off.

The configuration above makes it possible to control power to be fed, and output power may be adjusted.

(11) For example, the switching circuits include a high-side switching circuit and a low-side switching circuit, and the switching control circuit, for example, uses on-periods ratio modulation (ORM) control in which the high-side switching circuit and the low-side switching circuit are alternately turned on/off at a constant switching frequency, and the ratio between on periods of the high-side switching circuit and the low-side switching circuit is controlled.

The configuration above makes it possible to control power to be fed, and output power may be adjusted. In addition, the frequency band being used may be limited by using a fixed switching frequency, thereby EMC measures may be easily taken. In addition, the controllability for output control may also be improved.

(12) It is preferable that the power-reception-side rectifier circuit be a synchronized rectifier circuit including switching elements. As a result, the rectification loss may be reduced on the power reception side, and thus the wireless power-feeding apparatus may be miniaturized.

(13) It is preferable that the power receiving unit include an operating-frequency control circuit that controls an operating frequency (switching frequency) of the synchronized rectifier circuit. As a result, it becomes possible to adjust power to be fed not on the power transmission side but on the power reception side.

(14) It is preferable that the power receiving unit include a power-receiving-unit-side control circuit that controls a circuit on the power-receiving-unit side, and the power-receiving-unit-side control circuit operate using power received by the power receiving unit. As a result, no power source is needed on the power reception side, thereby reducing the size and weight of the wireless power-feeding apparatus.

(15) It is preferable that the power-reception-side rectifier circuit receive power from an output unit of the power-reception-side rectifier circuit and operate as the power-transmission-side alternating-current voltage generating circuit, and the power-transmission-side alternating-current voltage generating circuit receive power from its output unit and operate as the power-reception-side rectifier circuit, that is, it is preferable that power be fed bidirectionally. This enables bidirectional power feeding, and power may be fed from the power-receiving-unit side to the power-transmission-unit side and the received power may also be transmitted to another place using the power-receiving-unit side as a relay point. In addition, these units may also be used as a relay system, and long-distance power feeding becomes possible through relaying performed with a plurality of these units.

(16) It is preferable that the mutual inductance be an equivalent magnetizing inductance generated due to magnetic field coupling formed between the power transmission coil and the power reception coil. As a result, mutual inductors, which are components, may not be needed or may be reduced in size, thereby reducing the size and weight of a power transmission system apparatus.

(17) It is preferable that the power-transmission-side resonance mechanism or the power-reception-side resonance mechanism include an inductor, and the inductor be a leakage inductance component that is not involved in coupling in an inductance component of the power transmission coil or the power reception coil. As a result, no resonance-inductor component is necessary, thereby reducing the size and weight of the wireless power-feeding apparatus.

Advantageous Effects of Disclosure

The following advantages are provided according to the present disclosure.

(a) Since both the conduction loss and the switching loss may be reduced in a switching element, the amount of heat generated in the switching element may be significantly reduced.

(b) Since both the conduction loss and the switching loss may be reduced in a switching element, the power transmission efficiency of a wireless power-feeding system may be increased.

(c) A bridge short circuit may be prevented in a switching element by adjusting a dead time, and thus a reliable wireless power-feeding apparatus may be configured.

DETAILED DESCRIPTION

Figure 1:
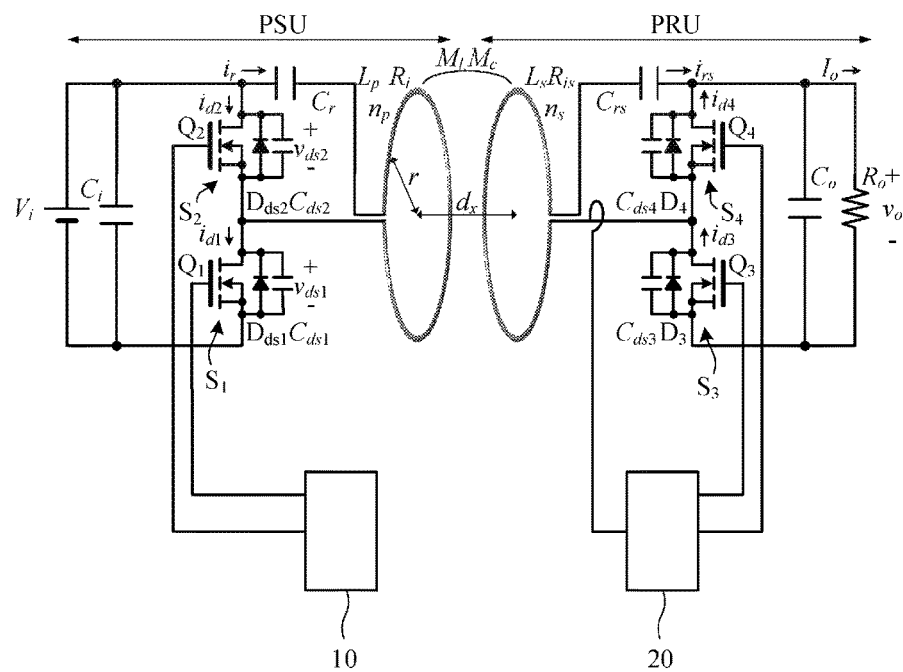
FIG. 1(A) is a circuit diagram of a wireless power-feeding apparatus 101 according to a first embodiment.
FIG. 1(B) is an equivalent circuit diagram of a portion of FIG. 1(A).
Figure 1:
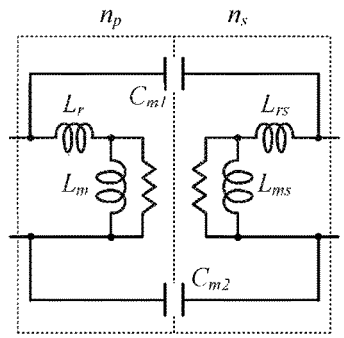

In the following, a plurality of embodiments for execution of the present disclosure will be described using some specific examples with reference to the drawings. The same sections will be denoted by the same reference numerals in the drawings. In the second and subsequent embodiments, the description regarding things the same as those of the first embodiment will be omitted and things different from those of the first embodiment will be described. In particular, the substantially same effects and advantages due to the substantially same configurations will not be repeatedly described in the embodiments.

First Embodiment

FIG. 1(A) is a circuit diagram of a wireless power-feeding apparatus 101 according to a first embodiment. FIG. 1(B) is an equivalent circuit diagram of a portion of FIG. 1(A).

The wireless power-feeding apparatus 101 includes a power transmission unit PSU provided with a power transmission coil np, and a power receiving unit PRU provided with a power reception coil ns. The wireless power-feeding apparatus 101 is a system that includes an input power source Vi at an input unit of the power transmission unit PSU and that supplies stable direct-current energy to a load Ro.

The power transmission unit PSU has a power-transmission-side resonance mechanism including the power transmission coil np, a resonance capacitor Cr, and switching circuits S1 and S2.

The switching circuit S1 is constituted by a circuit in which a switching element Q1, an antiparallel diode Dds1, and a parasitic capacitance Cds1 are connected in parallel. Likewise, the switching circuit S2 is constituted by a circuit in which a switching element Q2, an antiparallel diode Dds2, and a parasitic capacitance Cds2 are connected in parallel. In the following, the antiparallel diodes (parasitic diodes) will be simply referred to as "diodes".

The power transmission unit PSU includes a switching control circuit 10 that controls the switching elements Q1 and Q2.

The switching control circuit 10 causes the power-transmission-side resonance mechanism to generate a resonance current by intermittently applying a direct-current voltage to the power-transmission-side resonance mechanism through turning on-off of the switching circuits S1 and S2 at a predetermined switching frequency. For example, switching is performed in an industrial, scientific and medical (ISM) band of 6.78 MHz, the ISM band being international.

In this example, a power-transmission-side alternating-current voltage generating circuit constitutes a half-bridge circuit including the two switching circuits S1 and S2.

The power receiving unit PRU has a power-reception-side resonance mechanism and a capacitor Co, the power-reception-side resonance mechanism including the power reception coil ns, a resonance capacitor Crs, and switching circuits S3 and S4.

The switching circuit S3 is constituted by a circuit in which a switching element Q3, a diode Dds3, and a capacitor Cds3 are connected in parallel. Likewise, the switching circuit S4 is constituted by a circuit in which a switching element Q4, a diode Dds4, and a capacitor Cds4 are connected in parallel.

The power receiving unit PRU includes a switching control circuit 20 that controls the switching elements Q3 and Q4.

The switching control circuit 20 detects a current flowing through the power reception coil ns, and alternately turns on-off the switching elements Q3 and Q4 in synchronization with polarity reversal of the current. As a result, a resonance current flowing in the power-reception-side resonance mechanism is rectified in synchronization with changes in the flow direction of the current, and the resulting current is supplied to the load. These switching circuits S3 and S4 and the switching control circuit 20 constitute the power-reception-side resonance mechanism.

On the power transmission side, the switching control circuit 10 operates using an input voltage Vi as a voltage source. On the power reception side, the switching control circuit 20 operates using, as a power source, a voltage generated in the power-reception-side resonance mechanism, a voltage output to the load, or a power supply source or the like that is additionally provided.

FIG. 1(B) is an equivalent circuit diagram of a circuit including the power transmission coil np and the power reception coil ns. Both the power transmission coil np and the power reception coil ns are represented as equivalent circuits using an ideal transformer, mutual inductances, and leakage inductances. That is, the power transmission coil np is represented by a mutual inductance Lm and a leakage inductance Lr. Likewise, the power reception coil ns is represented by a mutual inductance Lms and a leakage inductance Lrs. Note that, although not clearly illustrated in FIG. 1(B), equivalent mutual capacitances Cm1 and Cm2 occur between the power transmission coil np and the power reception coil ns.

The power transmission coil np and the power reception coil ns constitute an electromagnetic resonance circuit in which magnetic field coupling and electric field coupling are mixed, magnetic field coupling occurring using an equivalent mutual inductance formed between the power transmission coil np and the power reception coil ns, and electric field coupling occurring using the mutual capacitances Cm1 and Cm2. Power is wirelessly fed from the power transmission unit PSU to the power receiving unit PRU using the electromagnetic resonance phenomenon. The "electromagnetic resonance circuit" is an example of an "electromagnetic coupling circuit" according to the present disclosure.

In contrast, the energy (reactive power) that is not transmitted from the power transmission unit but reflected is saved as resonance energy in the power-transmission-side resonance mechanism. The energy (reactive power) that is not output among the energy received by the power receiving unit but reflected is also stored as resonance energy in the power-reception-side resonance mechanism. Reflected power that is not penetrating power with respect to incident power may be stored as resonance energy in this manner without losing the energy of the reflected power.

Note that the mutual inductors Lm and Lms, which are components, may not be needed or may be reduced in size by using a magnetizing inductance that is an equivalent inductance due to magnetic field coupling formed between the power transmission coil np and the power reception coil ns, thereby reducing the size and weight of a power transmission system apparatus.

In addition, resonance inductors, which are components, may not be needed or may be reduced in size by using, as an inductor included in the power-transmission-side resonance mechanism or the power-reception-side resonance mechanism, the leakage inductances Lr and Lrs, which are included in an inductance component of the power transmission coil np or the power reception coil ns and are not involved in coupling, thereby reducing the size and weight of the power transmission system apparatus.

FIG. 2(A) is a voltage-current waveform diagram of various units and for illustrating an energy conversion operation of the wireless power-feeding apparatus 101 illustrated in FIG. 1. This example illustrates a switching operation waveform of the case where a switching element performs an optimum zero voltage switching (ZVS) operation. FIG. 2(B) is a diagram illustrating an example of switching timings of a conventional wireless power-feeding apparatus, and is a diagram illustrated so as to correspond to FIG. 2(A).

The wireless power-feeding apparatus 101 operates at timings as follows.

In this operation, the operation state of the power transmission unit PSU may be classified on a per-equivalent-circuit basis into four states: on period, off period, and two commutation periods. The gate-source voltages of the switching elements Q1 and Q2 are represented as voltages Vgs1 and Vgs2, and the drain-source voltages of the switching elements Q1 and Q2 are represented as voltages Vds1 and Vds2. A multi-resonant circuit including electromagnetic field coupling is designed to have a resonance frequency fr slightly lower than 6.78 MHz, and has a sufficiently small inductive reactance. The switching elements Q1 and Q2 are alternately turned on/off with a short dead time td therebetween, both the switching elements Q1 and Q2 being off in the dead time td. In the dead time td, in which the two switching elements Q1 and Q2 are off, commutation is performed by charging and discharging the parasitic capacitances Cds of the two switching elements Q1 and Q2 using a lagging current of a resonance current ir. The ZVS operation is realized by turning on the switching elements Q1 and Q2 in a parasitic-diode conduction period to after a commutation period tc. Energy conversion operations in the respective states in one switching period will be described in the following.

(1) State 1, Time t1 to t2

In state 1, the switching element Q1 is superficially conducting on the power transmission side. For example, when the switching element Q1 is a GaN FET, a reverse voltage −Vds1 is applied across both ends of the switching element Q1, and a voltage (Vgd1) is applied between the gate and the drain. The switching element Q1 enters a reverse conduction mode in which a threshold voltage is treated as an offset voltage, and operates similarly to an antiparallel diode. The diode Dds1, which is an equivalent diode between both ends of the switching element Q1, is turned on, and the ZVS operation is performed by turning on the switching element Q1 in this period. The resonance current it flows through the power transmission coil np, and the capacitor Cr is charged.

In FIG. 2(A), in a period TQ1, the drain-source voltage (Vds1) of the switching element Q1 is slightly negative, and the gate-source voltage (Vgs1) is applied, so that the switching element Q1 is conducting. That is, the period TQ1 is an operation period in the third quadrant of the switching element Q1. In this manner, when the gate-source voltage (Vgs1) is applied in the third quadrant when the switching element Q1 is turned on, the reverse voltage applied between the drain and the source of the switching element Q1 is reduced in the period, thereby reducing the conduction loss and the switching loss.

On the power reception side, a diode D3 or D4 is turned on and a resonance current irs flows through the power reception coil ns. When the diode D3 is conducting, the capacitor Crs is discharged, the voltage induced in the power reception coil ns and the voltage across both ends of the capacitor Crs are added together, and the voltage (power) is applied to the load Ro. When the diode D4 is conducting, the capacitor Crs is charged. The voltage across the capacitor Co is applied to the load Ro to supply power to the load Ro. When the switching element Q1 is turned off, the state shifts to state 2.

(2) State 2, Time t2 to t3

By the resonance current ir that has flowed through the power transmission coil np, a capacitor Cds1 between both ends of the switching element Q1 is charged and a capacitor Cds2 between both ends of the switching element Q2 is discharged. When the voltage Vds1 becomes the voltage Vi, and the voltage Vds2 becomes 0 V, the state shifts to state 3.

(3) State 3, Time t3 to t4

In state 3, the switching element Q2 is conducting on the power transmission side. For example, when the switching element Q2 is a GaN FET, a reverse voltage −Vds2 is applied across both ends of the switching element Q2, and a voltage (Vgd2) is applied between the gate and the drain. The switching element Q2 enters a reverse conduction mode in which a threshold voltage is treated as an offset voltage, and operates similarly to an antiparallel diode. The diode Dds2, which is an equivalent diode between both ends of the switching element Q2, is turned on, and the ZVS operation is performed by turning on the switching element Q2 in this period. The resonance current ir flows through the power transmission coil np, and the capacitor Cr is discharged.

In FIG. 2(A), in a period TQ2, the drain-source voltage (Vds2) of the switching element Q2 is slightly negative, and the gate-source voltage (Vgs2) is applied, so that the switching element Q2 is conducting. That is, the period TQ2 is an operation period in the third quadrant of the switching element Q2. In this manner, when the gate-source voltage (Vgs2) is applied in the third quadrant when the switching element Q2 is turned on, the reverse voltage applied between the drain and the source of the switching element Q2 is reduced in the period, thereby reducing the conduction loss and the switching loss.

On the power reception side, the diode D3 or D4 is turned on and the resonance current irs flows through the power reception coil ns. When the diode D3 is conducting, the capacitor Crs is discharged, the voltage induced in the coil ns and the voltage across both ends of the capacitor Crs are added together, and power is supplied to the load Ro. When the diode D4 is conducting, the capacitor Crs is charged. The voltage across the capacitor Co is applied to the load Ro to supply power to the load Ro. When the switching element Q2 is turned off, the state shifts to state 4.

(4) State 4, Time t4 to t1

By the resonance current ir that has flowed through the power transmission coil np, the capacitor Cds1 between both ends of the switching element Q1 is discharged and the capacitor Cds2 between both ends of the switching element Q2 is charged. When the voltage Vds1 becomes 0 V, and the voltage Vds2 becomes the voltage Vi, the state shifts to the state 1 again. Thereafter, the state periodically and repeatedly shifts from the state 1 to the state 4.

In a power receiving circuit, the diode D3 or D4 is turned on and a current flows in a forward direction. In a periodic, steady operation, the waveforms of the currents ir and irs are almost that of a sine wave due to resonance phenomenon.

In contrast, in a conventional wireless power-feeding apparatus, as illustrated in FIG. 2(B), switching elements are turned on at timings outside a third-quadrant operation (timings outside periods ta). Thus, when the switching elements Q1 and Q2 are turned on, the gate-source voltages (Vgs1, Vgs2) are not applied in the third quadrant, the reverse voltages applied between the drain and the source of the switching element Q1 and between the drain and the source of the switching element Q2 are high in the period, thereby causing the conduction loss and the switching loss. The loss in the third-quadrant operation and in the period will be described later.

Some forms of switching-based power-to-be-fed control may be used. One of the forms is frequency control that is pulse frequency modulation (PFM). The amplitude of a resonance current is changed by changing a switching frequency using changes, with frequency, in combined impedance of a multi-resonant circuit, and consequently the power to be fed may be controlled, thereby power corresponding to a request from an electronic device may be supplied to the electronic device and the electronic device may be appropriately operated.

In addition, another form of switching control is on-periods ratio control that is on-periods ratio modulation (ORM). In ORM, the switching element Q2 (a high-side switching circuit) and the switching element Q1 (a low-side switching circuit) are alternately turned on/off at a constant switching frequency, and the ratio between on periods of the high-side switching circuit and the low-side switching circuit is controlled. According to ORM, in the case where operation is performed with a fixed switching frequency, an on-period ratio Da is controlled that is the ratio between on periods of the two switching circuits S1 and S2. Under the on-period ratio control, as an on-time ratio D that is the ratio of on periods of the first switching circuit S1 to switching periods approaches D=0.5, output power increases. According to the on-period ratio control, the frequency band being used may be limited by using a fixed switching frequency, thereby electromagnetic compatibility (EMC) measures may be easily taken. In addition, the controllability for output control may also be improved.

Note that receiving power may also be adjusted not on the power-transmission-unit (PSU) side but on the power-receiving-unit (PRU) side by controlling an operating frequency of a synchronized rectifier circuit on the power-receiving-unit (PRU) side. Large power may be obtained by operating the synchronized rectifier circuit in synchronization with an operating frequency on the power-transmission-unit (PSU) side. In contrast, receiving power may be reduced by operating the synchronized rectifier circuit so as to be out of synchronization with the operating frequency on the power-transmission-unit (PSU) side, so that the receiving power may be treated as small power.

Since the power transmission unit PSU and the power receiving unit PRU are circuits having substantially the same configuration and are symmetrical, the wireless power-feeding apparatus 101 according to the present embodiment may be used as a bidirectional power transmission system apparatus. That is, a power-reception-side rectifier circuit (S3, S4) receives power from its output unit, and serves as, as a result of switching, a power-transmission-side alternating-current voltage generating circuit. A power-transmission-side alternating-current voltage generating circuit (S1, S2) receives power from its output unit, and serves as, as a result of switching, a power-reception-side rectifier circuit.

This enables bidirectional power feeding, and power may be fed from the power-receiving-unit (PRU) side to the power-transmission-unit (PSU) side, and received power may be transmitted to another place using the power-receiving-unit (PRU) side as a relay point. In addition, these units may also be used as a relay system, and long-distance power feeding becomes possible through relaying using a plurality of these units, which have been prepared.

Characteristic configurations and effects according to the present embodiment are as in the following (A), (B), and (C).

(A) The switching control circuit illustrated in FIG. 1 performs switching of the switching elements of the power-transmission-side alternating-current voltage generating circuit at a switching frequency at which the impedance becomes inductive with respect to the multi-resonant circuit. That is, the current it flowing into the multi-resonant circuit (a circuit having the electromagnetic coupling circuit, the power-transmission-side resonance mechanism, and the power-reception-side resonance mechanism) has a sine-wave-shaped resonance current waveform lagging behind an alternating-current voltage generated from the power-transmission-side alternating-current voltage generating circuit (S1, S2), and power is transmitted from the power transmission side to the power reception side in both on and off periods of the switching elements Q1 and Q2. In this manner, the impedance obtained when the load side is seen from the power-transmission-side alternating-current voltage generating circuit is an inductive reactance. Accordingly, a "lagging resonance current" is generated in a switching period, and commutation for charging or discharging of parallel capacitors Cds1 and Cds2 of the switching circuits S1 and S2 becomes possible.

(B) The switching control circuit 10 supplies a control signal to the switching elements to turn on the switching elements in an operation in the third quadrant of the current-voltage characteristics of the switching elements Q1 and Q2. In this case, the four quadrants of the current-voltage characteristics are as follows.

|  | Current | Voltage |
| --- | --- | --- |
| First quadrant | Positive | Positive |
| Second quadrant | Positive | Negative |
| Third quadrant | Negative | Negative |
| Fourth quadrant | Negative | Positive |

Figure 2:
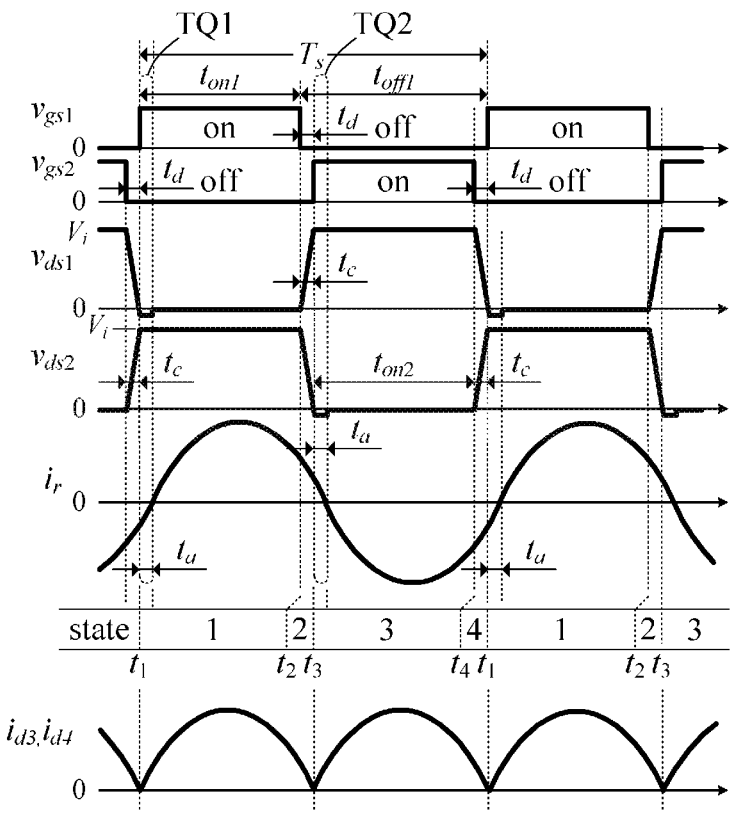
FIG. 2(A) is a voltage-current waveform diagram of various units and for illustrating an energy conversion operation of the wireless power-feeding apparatus 101 illustrated in FIG. 1.
FIG. 2(B) is a diagram illustrating an example of switching timings of a conventional wireless power-feeding apparatus, and is a diagram illustrated so as to correspond to FIG. 2(A).
Figure 2:
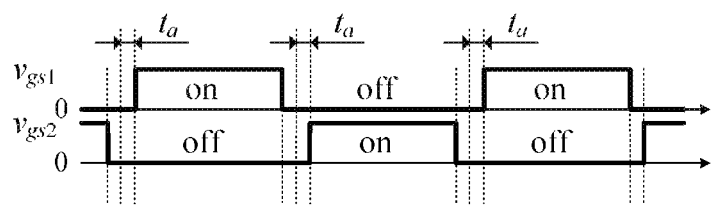

In FIG. 2, at the time t3, the control voltage Vgs2 between the gate and the source of the switching element Q2 is made positive to turn on the switching element Q2. The period ta starting at the time t3 corresponds to an operation in the third quadrant of the switching element Q2. At the time t1, the control voltage Vgs1 between the gate and the source of the switching element Q1 is made positive to turn on the switching element Q1. The period ta starting at the time t1 corresponds to an operation in the third quadrant of the switching element Q1.

In this manner, in the third-quadrant operations of the switching elements Q1 and Q2, the switching control circuit 10 supplies the control signal to the switching elements to turn on the switching elements, thereby reducing the conduction loss in the switching elements Q1 and Q2.

(C) The dead time td is shorter than a time (tc+ta) obtained by adding the commutation period tc in which the voltage between both ends of the switching element Q1 or Q2 changes to an operation time ta in the third quadrant of the current-voltage characteristics. Furthermore, the dead time td is set to a value sufficiently close to that of the commutation period tc while satisfying tc≤td<(tc+ta). As a result, both the conduction loss and the switching loss are reduced in the switching elements Q1 and Q2.

Figure 3:
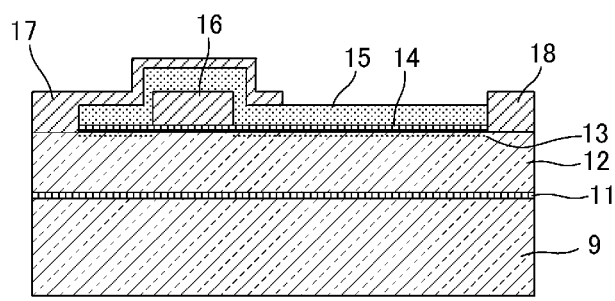
FIG. 3 is a cross section of the configuration of a compound semiconductor used as switching elements Q1, Q2, Q3, and Q4.

FIG. 3 is a cross section of the configuration of a compound semiconductor used as the switching elements Q1, Q2, Q3, and Q4. This element is a GaN FET, and specifically an enhancement-mode GaN-based power transistor. This transistor has a horizontal configuration including a region for a small gate electrode 16 and a die region. An aluminum-nitride insulating layer 11 is formed on a Si substrate 9, and a GaN layer 12 is formed on the aluminum-nitride insulating layer 11. An AlGaN electron-generating layer 14 is formed on the surface of this GaN layer, and a 2DEG (two-dimensional electron gas layer) 13 is formed on the undersurface of the AlGaN electron-generating layer 14. A dielectric layer 15 is formed between the AlGaN electron-generating layer 14 and a source electrode 17. The source electrode 17 and a drain electrode 18 penetrate through the AlGaN layer 14 to the top of the AlGaN layer 14 so as to come into contact with the 2DEG (two-dimensional electron gas layer) 13 therebetween. As a result, the section between the source and the drain forms a short circuit until an electron reservoir dissipates in the 2DEG. The gate electrode 16 is formed on the AlGaN layer, and a carrier absence layer is formed under the gate structure. No electron exists in the carrier absence layer. As a result, this element is a normally-off, namely, enhancement-mode device.

Electric characteristics of a GaN FET are significantly similar to those of a Si MOSFET. A GaN FET realizes reverse conduction not using a parasitic diode, which is included in a Si MOSFET, but using a different mechanism. When a reverse voltage −Vds is applied between the drain and the source of a GaN FET, a voltage Vgd is applied between the gate and the drain. The GaN FET is reverse conducting using a threshold voltage as an offset voltage, and operates as an antiparallel diode. An equivalent diode may be estimated between both ends of the GaN FET. Only the majority carrier is involved in conduction of a GaN semiconductor, and "reverse recovery" phenomenon as in general diodes does not occur. A forward direction voltage of an equivalent internal diode is higher than a forward voltage drop across a diode included in a Si MOSFET, and the equivalent internal diode operates similarly to a Schottky diode having a forward voltage drop slightly higher than that of Si. No minority carrier exists, and the value of a reverse recovery charge amount is 0. Thus, large power loss due to reverse recovery characteristics does not occur. Moreover, the gate capacitance and the output capacitance are small, thereby enabling a high-speed switching operation. Use of a small package enables reduction of the parasitic capacitance and the parasitic inductance.

Figure 4:
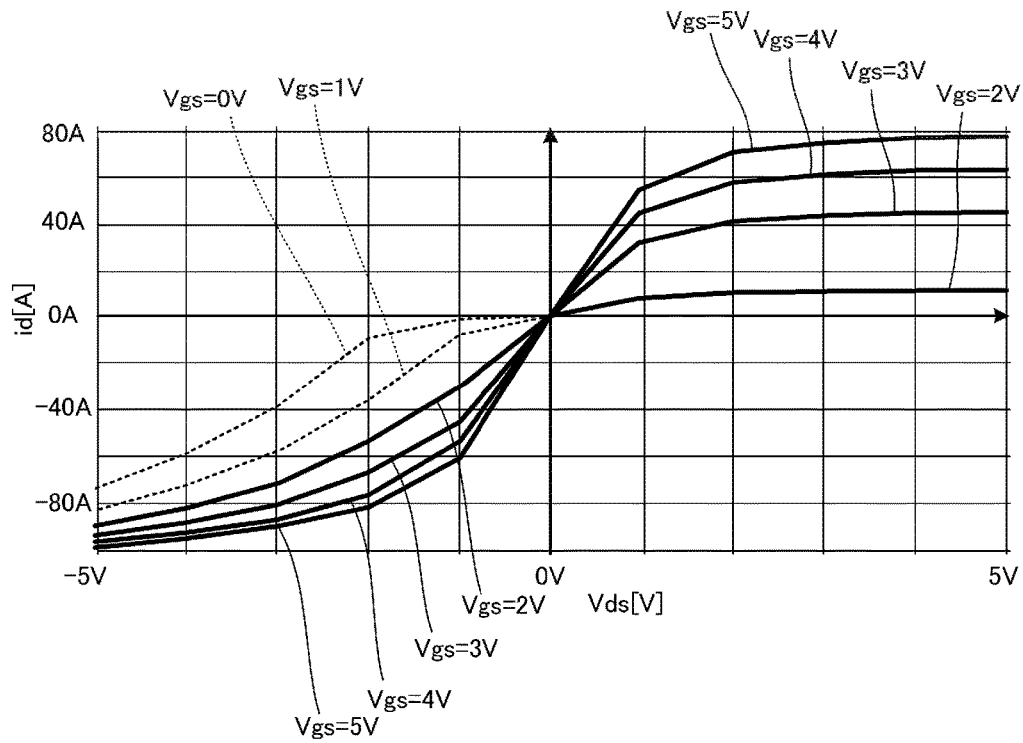
FIGS. 4(A) and (B) are diagrams illustrating, on a per-gate-voltage Vgs basis, current-voltage characteristics between a drain current id and a drain voltage Vds of a compound semiconductor transistor.
Figure 4:
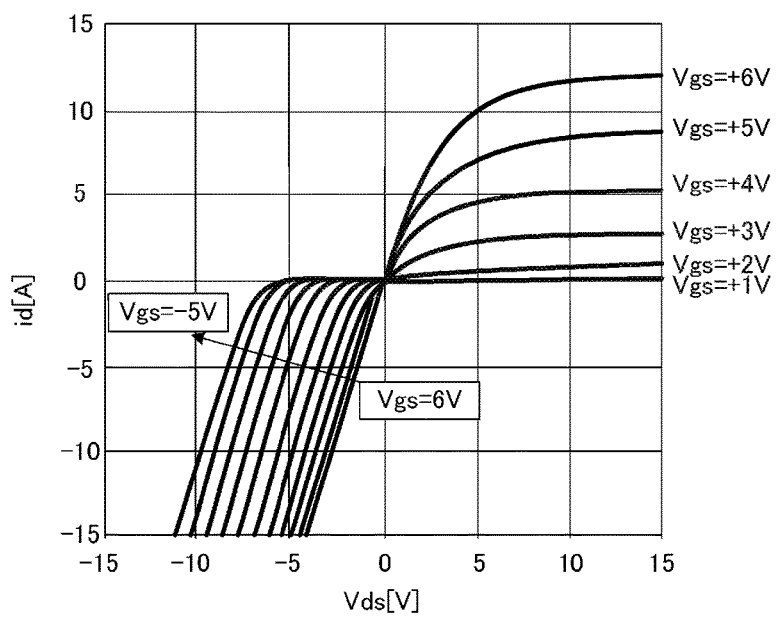

FIG. 4(A) is a representative diagram illustrating, on a per-gate-voltage Vgs basis, current-voltage characteristics between a drain current id and a drain voltage Vds of a GaN FET, which is a compound semiconductor transistor. In FIG. 4(A), the horizontal axis represents the drain voltage Vds, the vertical axis represents the drain current id, and four quadrants are illustrated. In an operation in the third quadrant, a large reverse drain voltage (−Vds) occurs with a small drain current id in the state of Vgs=0 V meaning that no gate voltage is applied. The power loss (id×Vds) thus significantly increases.

In the present embodiment, the magnitude of the reverse drain voltage Vds may be reduced through application of the gate voltage (for example, Vgs=5 V) in the third-quadrant operation. The power loss (id×Vds) may thus be significantly reduced.

FIG. 4(B) is a representative diagram illustrating, on a per-gate-voltage Vgs basis, current-voltage characteristics between a drain current id and a drain voltage Vds of another compound semiconductor transistor. It can be seen that, in an operation in the third quadrant illustrated in FIG. 4(B), a larger reverse drain voltage (−Vds) occurs when the gate voltage has a negative potential with respect to the state of Vgs=0 V meaning that no gate voltage is applied. Thus, when the gate voltage Vgs has a negative potential smaller than 0 V, the power loss (id×Vds) significantly increases.

In the present embodiment, in the third-quadrant operation, the power loss (id×Vds) in the third-quadrant operation may be reduced by performing control such that the gate voltage does not become negative, and the power loss (id×Vds) may be reduced by reducing the magnitude of the reverse drain voltage Vds through application of the gate voltage (for example, Vgs=+6 V).

In addition, according to the present embodiment, use of a compound semiconductor transistor further provides the following advantages.

Both the conduction loss and the switching loss may be reduced in a compound semiconductor transistor by making good use of high-speed operation characteristics of the compound semiconductor transistor.

No antiparallel diode having a small forward voltage drop needs to be connected, thereby reducing the number of components. This enables miniaturization of a wireless power-feeding apparatus.

A compound semiconductor transistor generally has a small amount of gate charge, and thus the power loss may be reduced in a switching control circuit that drives the compound semiconductor.

The transistor having the configuration illustrated in FIG. 3 realizes reverse conduction not using a parasitic diode, which is included in a Si MOSFET, but using a different mechanism. When a reverse voltage is applied between the drain and the source, a voltage Vgd is applied between the gate and the drain. As a result, reverse conduction using a threshold voltage as an offset voltage becomes possible, and an equivalent diode that operates similarly to a diode connected in an antiparallel manner may be estimated. Note that a reverse voltage drop −Vds in the third-quadrant operation has a larger value than a voltage drop across the parasitic diode of the Si MOSFET. When Vgs=0 V, even with a small current, the voltage drop is large, which is about −1.8 V since the voltage drop has an offset voltage. In ZVS operations except for an optimal ZVS operation, an equivalent parasitic diode is turned on and the conduction loss occurs. As described above, to reduce this conduction loss, an on resistance Ron is reduced by minimizing the dead time while keeping the commutation period, and by applying a voltage Vgs to perform turning on as in a synchronization rectification operation.

$$tc \approx tr \approx tf \leq td \leq (tc+ta) \quad (1)$$

By setting the period tc=td in Expression 1, a low-conduction-loss operation equivalent to the optimal ZVS operation may be realized. By setting the voltage Vgs to 2 to 3 V or higher, the reverse voltage drop −Vds may be made to have a sufficiently small value similarly to as in a first-quadrant operation.

Figure 5:
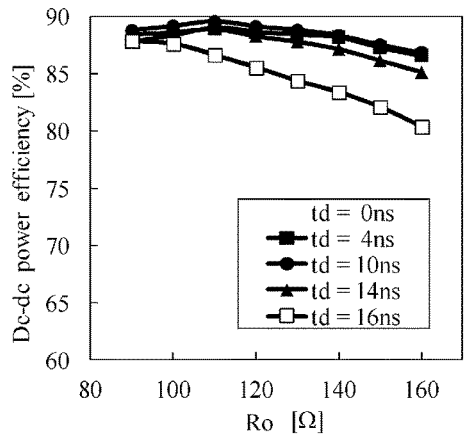
FIGS. 5(A) and (B) are diagrams illustrating the DC-DC power conversion efficiency of the wireless power-feeding apparatus 101.
Figure 5:
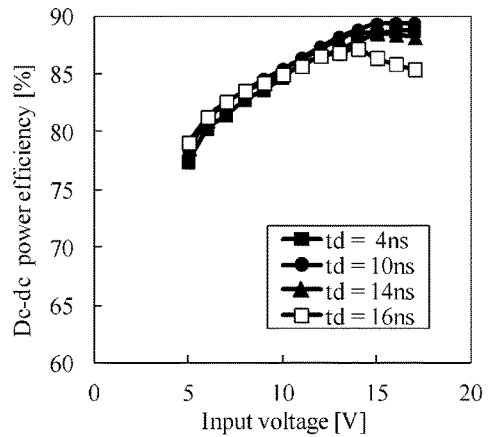

FIG. 5(A) is a diagram illustrating a relationship of power conversion efficiency to load, and FIG. 5(B) is a diagram illustrating a relationship of power conversion efficiency to input voltage. FIG. 5(A) is a diagram illustrating the case where the dead time td is adjusted to 0 to 16 ns and a load resistance Ro is changed from 90 to 160Ω with the input voltage Vi=15 V. FIG. 5(B) is a diagram illustrating the case where the input voltage Vi is changed from 5 to 17 V with the load resistance Ro=110Ω. In either case, an operation equivalent to the optimal ZVS operation is performed in a direct-current resonance system with a distance dx=3 mm.

The commutation period tc that is the smallest switching period is about 10 ns. As illustrated in FIGS. 5(A) and (B), the highest power efficiency is achieved when the dead time td is set to 10 ns. In this manner, when the commutation period tc and the dead time td are made almost equal, an operation equivalent to the optimal ZVS operation may be realized.

In contrast, when the dead time td is less than 10 ns, the FET performs an active region operation which results in current-voltage overlapping. Due to this overlapping, a sufficient ZVS operation is not realized, thereby increasing the switching loss. When td is greater than or equal to 10 ns in an operation in the third quadrant of current-voltage characteristics of the FET, there is a period in which no control signal is supplied to a control terminal of the FET and the FET is not conducting, thereby increasing the conduction loss. In addition, a sufficient on period, that is, a conduction period of the FET is not ensured, the resonance current decreases, and the output power decreases, and as a result the power conversion efficiency decreases.

Figure 6:
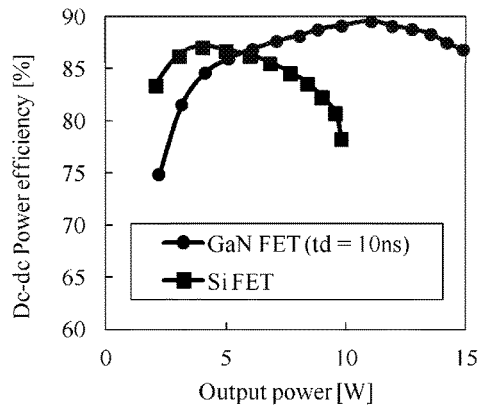
FIGS. 6(A) and (B) are diagrams for comparing the power conversion efficiency of the case where a GaN FET is used as a switching element with that of the case where a Si MOSFET is used as a switching element.
Figure 6:
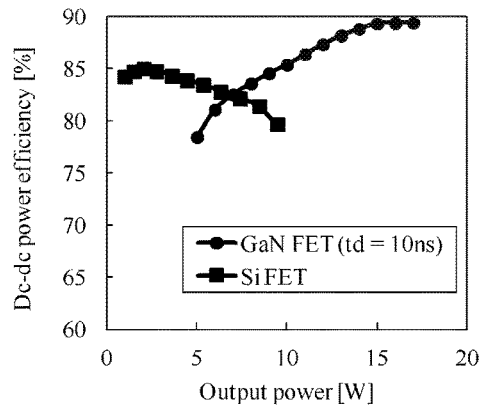

FIGS. 6(A) and (B) are diagrams for comparing the power conversion efficiency of the case where a GaN FET is used as the switching elements with that of the case where a Si MOSFET is used as the switching elements. FIG. 6(A) is a diagram illustrating the case where the load resistance Ro is changed from 20 to 160Ω with the input voltage Vi=15 V. FIG. 6(B) is a diagram illustrating the case where the input voltage Vi is changed from 5 to 17 V with the load resistance Ro=110Ω. In either case, regarding the GaN FET and the Si MOSFET, an operation equivalent to the optimal ZVS operation is performed in a direct-current resonance system with a distance dx=3 mm.

In FIG. 6(A), in the case of the Si MOSFET, a maximum power conversion efficiency of 87.1% and an output of 4.01 W are obtained with Vi=15 V and Ro=40Ω. In contrast to this, in the case of the GaN FET, the dead time td is adjusted to 10 ns, and a power conversion efficiency of 89.5%, which is markedly high, and an output of 11.1 W are achieved with the load Ro=110Ω.

In FIG. 6(B), in the case of the Si MOSFET, a maximum DC-DC power efficiency of 85.1% and an output of 2.01 W are obtained with Vi=7 V. In contrast, in the case of the GaN FET, the dead time td is adjusted to 10 ns, and a DC-DC power efficiency of 89.4%, which is significantly high, and an output of 14.3 W are achieved with Vi=17 V. Since the switching speed is low in the Si FET, the power efficiency and the output voltage decrease. In contrast, the GaN FET can sufficiently handle a high-speed operation of 6.78 MHz, and a power conversion efficiency that is markedly higher than ever before is achieved by adjusting the dead time.

The following advantages are provided according to the present embodiment.

(1) Since both the conduction loss and the switching loss may be reduced in a switching element, the amount of heat generated in the switching element may be significantly reduced.

(2) Since both the conduction loss and the switching loss may be reduced in a switching element, the power efficiency of a wireless power-feeding system may be increased.

(3) A bridge short circuit may be prevented in a switching element by adjusting the dead time, and a reliable wireless power-feeding system may be configured.

(4) Since the power transmission coil np and the power reception coil ns are air-core coils (inductors), no loss occurs due to magnetic substances in a high-frequency region. Thus, a high power conversion efficiency in a MHz band may be obtained.

(5) A power transmission efficiency is increased through forming of an electromagnetic coupling circuit (electromagnetic resonance circuit) in which magnetic field coupling and electric field coupling are combined using the resonance between the power transmission coil np and the power reception coil ns, that is, by transmitting power using not only magnetic field coupling but also electric field coupling. As a result, a high-efficiency operation becomes possible.

Second Embodiment

In a second embodiment, an example will be illustrated in which the power-transmission-side resonance mechanism and the power-reception-side resonance mechanism are individually structurally configured.

Figure 7:
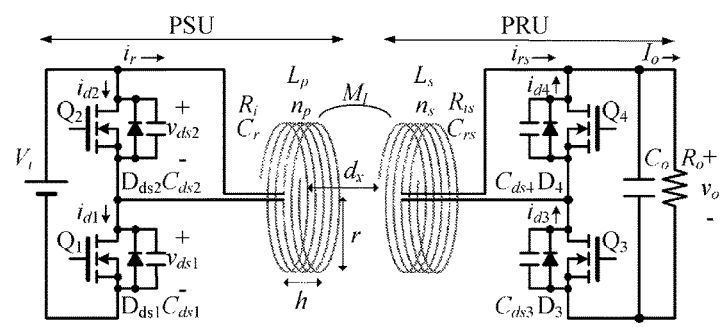
FIG. 7 is a circuit diagram of a wireless power-feeding apparatus 102 according to a second embodiment.

FIG. 7 is a circuit diagram of a wireless power-feeding apparatus 102 according to the second embodiment. In this example, helical coils are used as the power transmission coil np and the power reception coil ns, and power is fed at the center thereof. The helical coil on the power transmission unit side thus has an equivalent inductance Lp and an equivalent capacitance Cr, and constitutes a resonance circuit. Likewise, the helical coil on the power receiving unit side has an inductance Ls and a capacitance Crs, and constitutes a resonance circuit. Since the winding axes of these two helical coils are nearly aligned (are nearly coaxial to each other), an electromagnetic resonance coupling circuit is formed between the power transmission coil np and the power reception coil ns. The rest of the configuration is the same as that illustrated in the first embodiment.

In this manner, power may be fed through space by exchanging electric field energy and magnetic field energy between the power-transmission-side resonance mechanism and the power-reception-side resonance mechanism.

According to the present embodiment, the resonance mechanism may be simply configured, and the number of components may be reduced. In addition, a wireless power-feeding system may be miniaturized.

Third Embodiment

In a third embodiment, a wireless power-feeding apparatus having filters will be described.

Figure 8:
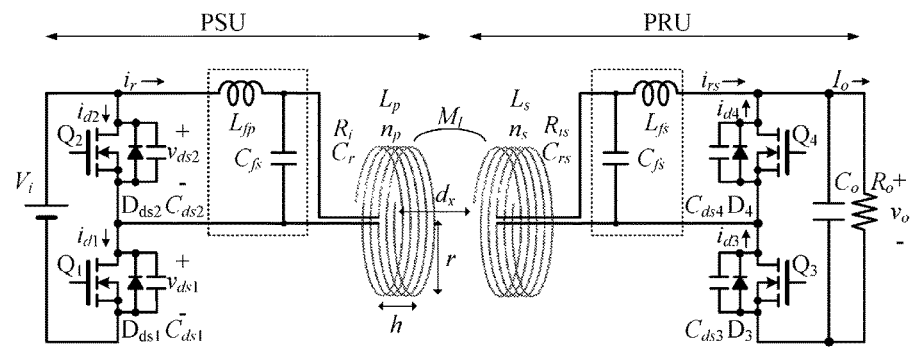
FIG. 8 is a circuit diagram of a wireless power-feeding apparatus 103 according to a third embodiment.

FIG. 8 is a circuit diagram of a wireless power-feeding apparatus 103 according to the third embodiment. In this example, a first filter including an inductor component Lfp and a capacitor component Cfp is provided between the power-transmission-side alternating-current voltage generating circuit and the power-transmission-side resonance mechanism. In addition, a second filter including an inductor component Lfs and a capacitor component Cfs is provided between the power-reception-side resonance mechanism and the rectifier circuit. The rest of the configuration is the same as those illustrated in the first and second embodiments.

Both the first and second filters serve as low pass filters. For these low pass filters, cutoff frequencies are set so as to reduce harmonic components of the waveforms of currents flowing in the resonance mechanisms. In this manner, the presence of the filters may reduce the harmonic components of the waveforms of the currents flowing in the resonance mechanisms, and thus reduce electromagnetic interference (EMI) noise. Accordingly, the electromagnetic compatibility (EMC) with other electronic devices may be improved. For example, the degree of interference from, for example, wireless communication devices may be reduced. In addition, the presence of the filters may convert the impedance of the resonance mechanism. That is, impedance matching may be achieved. As a result, a current and a voltage appropriate for a load may be applied.

Fourth Embodiment

Figure 9:
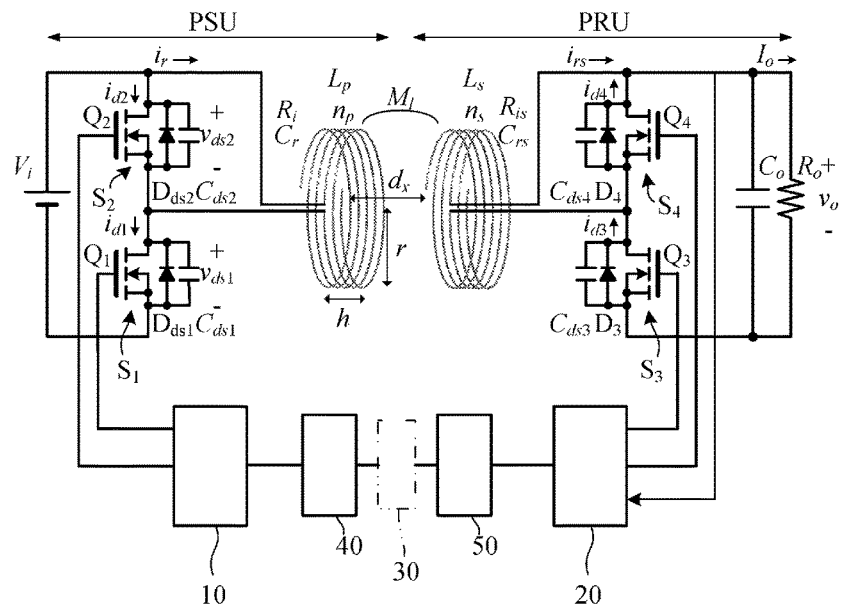
FIG. 9 is a circuit diagram of a wireless power-feeding apparatus 104 according to a fourth embodiment.

FIG. 9 is a circuit diagram of a wireless power-feeding apparatus 104 according to a fourth embodiment.

The switching control circuit 20 detects output information (for example, a voltage and a current or a power output to the load Ro), and transfers feedback information to the power-transmission-unit (PSU) side via a power-reception-side communication circuit 50. A power-transmission-side communication circuit 40 controls, on the basis of the output information received from the power-reception-side communication circuit 50 via signal transfer element 30, the power-transmission-side alternating-current voltage generating circuit (the switching circuits S1 and S2) to control power to be fed.

The power-reception-side communication circuit 50 is an example of an "output-information transmission circuit" according to the present disclosure. The power-transmission-side communication circuit 40 is an example of an "output-information reception circuit" according to the present disclosure.

In this manner, a current and a voltage appropriate for a load may be applied by controlling, on the basis of the feedback information from the power receiving unit, the power to be fed.

Note that the power-transmission-side communication circuit 40 transfers a control timing signal for the switching elements Q1 and Q2 to the power-reception-side communication circuit 50. The switching control circuit 20 performs synchronization rectification control by performing switching of the switching elements Q3 and Q4 in synchronization with this timing signal.

The signal transfer element 30 transfers, using for example a wireless communication circuit, the output information to the power-transmission-unit side. In addition, the signal transfer element 30 converts the output signal into an optical signal, transfers the optical signal, and converts the optical signal into an electrical signal (a reception signal). With these configurations, the power to be fed may be adjusted in an electrically insulated manner on the power-transmission-unit side.

Fifth Embodiment

Figure 10:
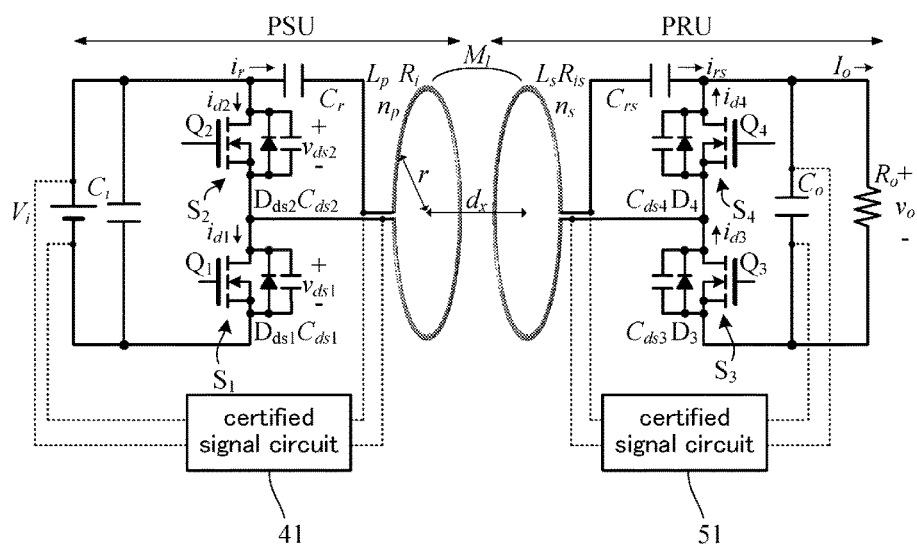
FIG. 10 is a circuit diagram of a wireless power-feeding apparatus 105 according to a fifth embodiment.

FIG. 10 is a circuit diagram of a wireless power-feeding apparatus 105 according to a fifth embodiment. In the wireless power-feeding apparatus 105, the power transmission unit PSU includes a power-transmission-side communication circuit 41 that operates using the input power source Vi as a power source and that uses the power transmission coil np as a communication coil (a near-field antenna). In addition, the power receiving unit PRU includes a power-reception-side communication circuit 51 that operates using an output voltage of the power receiving unit as a power source and that uses the power reception coil ns as a communication coil (a near-field antenna). That is, the power transmission coil np and the power reception coil ns play both roles of power transmission and signal communication. As a result, miniaturization of the power transmission unit may be achieved in terms of size and weight.

A communication signal is superimposed by modulating a power-transmission frequency serving as a carrier frequency. The communication signal is thus also communicated via an electromagnetic resonance field. Through this communication, various types of data and a timing signal may be transmitted from a power transmission unit to an appropriate (desired) power receiving unit. Alternatively, various types of data and a timing signal may be transmitted from a power receiving unit to an appropriate (desired) power transmission unit. For example, various states on the power-transmission-unit side or various states on the power-receiving-unit side may be exchanged between the power-transmission-unit side and the power-receiving-unit side. Alternatively, a power receiving unit may perform synchronization rectification in synchronization with switching of a switching element of a power transmission unit.

Since, unlike power transmission, signal transmission does not increase loss even when the power transmission efficiency is low, the communication signal may become independent of the power-transmission frequency.

Lastly, the description of the embodiments above are examples in terms of all points and are not intended to be construed as limitations. Those skilled in the art may make changes and modifications as appropriate. For example, portions of the configurations illustrated in different embodiments may be replaced with each other or combined. The scope of the present disclosure is indicated not by the embodiments described above but by the scope of the claims. Furthermore, it is intended that the scope of the present disclosure includes equivalents to the scope of the claims and all modifications within the scope of the claims.

The invention claimed is:

1. A wireless power-feeding apparatus that wirelessly feeds power from a power transmission unit to a power receiving unit, the wireless power-feeding apparatus comprising:
an electromagnetic coupling circuit that includes a power transmission coil on the power-transmission-unit side and a power reception coil on the power-receiving-unit side;
a power-transmission-side alternating-current voltage generating circuit that includes switching circuits constituted by parallel connection circuits including switching elements, equivalent diodes, and capacitors, the switching circuits being electrically connected to the power transmission coil, and that causes the power transmission coil to generate an alternating-current voltage from a direct-current voltage input by performing switching of the switching circuits;
a switching control circuit that causes the power-transmission-side alternating-current voltage generating circuit to generate an alternating-current voltage having a square waveform or a trapezoidal waveform by alternately turning on/off the switching elements of the power-transmission-side alternating-current voltage generating circuit with a dead time therebetween;
a power-reception-side rectifier circuit that rectifies the alternating-current voltage generated at the power reception coil to a direct-current voltage;
a power-transmission-side resonance mechanism that is formed on the power transmission side and that includes a first resonance capacitor; and
a power-reception-side resonance mechanism that is formed on the power reception side and that includes a second resonance capacitor,
wherein
the electromagnetic coupling circuit causes electric field energy or magnetic field energy to be exchanged between the power-transmission-side resonance mechanism and the power-reception-side resonance mechanism,
the electromagnetic coupling circuit, the power-transmission-side resonance mechanism, and the power-reception-side resonance mechanism together constitute a multi-resonant circuit, and
the switching control circuit
performs switching of the switching elements of the power-transmission-side alternating-current voltage generating circuit at a switching frequency at which an impedance of the multi-resonant circuit becomes inductive,
turns on the switching elements by supplying a control signal to control terminals of the switching elements in an operation in a third quadrant of current-voltage characteristics of the switching elements, and reduces both conduction loss and switching loss in the switching elements by determining the dead time so that tc≤td<(tc+ta) is satisfied, tc representing a commutation period in which voltages between both ends of the switching circuits change, to representing a period in which the operation in the third quadrant is performed, and td representing the dead time.

2. The wireless power-feeding apparatus according to claim 1, wherein the switching elements are compound semiconductor transistors having electric characteristics with which the magnitude of a reverse voltage is reduced in the operation in the third quadrant by supplying the control signal to the control terminals.

3. The wireless power-feeding apparatus according to claim 1, wherein the power-transmission-side resonance mechanism or the power-reception-side resonance mechanism is structurally configured.

4. The wireless power-feeding apparatus according to claim 1, wherein a first filter including an inductor component and a capacitor component is provided between the power-transmission-side alternating-current voltage generating circuit and the power-transmission-side resonance mechanism or a second filter including an inductor component and a capacitor component is provided between the power-reception-side resonance mechanism and the rectifier circuit.

5. The wireless power-feeding apparatus according to claim 1, wherein the power transmission coil and the power reception coil are air-core coils.

6. The wireless power-feeding apparatus according to claim 1, wherein the electromagnetic coupling circuit transmits power from the power transmission side to the power reception side using electric field coupling between the first resonance capacitor and the second resonance capacitor.

7. The wireless power-feeding apparatus according to claim 1, wherein the power receiving unit includes an output-information transmission circuit that detects output information regarding an output of the power-reception-side rectifier circuit and that transmits the output information to the power-transmission-unit side, and
the power transmission unit includes an output-information reception circuit that receives the output information and a power-to-be-fed control circuit that controls, by controlling the power-transmission-side alternating-current voltage generating circuit in accordance with the output information, power to be fed.

8. The wireless power-feeding apparatus according to claim 1, wherein the output-information transmission circuit is a circuit that transmits the output information in wireless communication, and the output-information reception circuit is a circuit that receives the output information in wireless communication.

9. The wireless power-feeding apparatus according to claim 1, wherein the output-information transmission circuit is a circuit that transmits the output information through conversion of an electrical signal into an optical signal, and the output-information reception circuit is a circuit that receives the output information through conversion of the optical signal into the electrical signal.

10. The wireless power-feeding apparatus according to claim 1, wherein the switching circuits include a high-side switching circuit and a low-side switching circuit, and
the switching control circuit uses pulse frequency modulation control in which a switching frequency is changed at which the high-side switching circuit and the low-side switching circuit are alternately turned on/off.

11. The wireless power-feeding apparatus according to claim 1, wherein the switching circuits include a high-side switching circuit and a low-side switching circuit, and
the switching control circuit uses on-periods ratio modulation control in which the high-side switching circuit and the low-side switching circuit are alternately turned on/off at a constant switching frequency, and the ratio between on periods of the high-side switching circuit and the low-side switching circuit is controlled.

12. The wireless power-feeding apparatus according to claim 1, wherein the power-reception-side rectifier circuit is a synchronized rectifier circuit including switching elements.

13. The wireless power-feeding apparatus according to claim 1, wherein the power receiving unit includes an operating-frequency control circuit that controls an operating frequency of the synchronized rectifier circuit.

14. The wireless power-feeding apparatus according to claim 1, wherein the power receiving unit includes a power-receiving-unit-side control circuit that controls a circuit on the power-receiving-unit side, and the power-receiving-unit-side control circuit operates using power received by the power receiving unit.

15. The wireless power-feeding apparatus according to claim 1, wherein the power-reception-side rectifier circuit receives power from an output unit of the power-reception-side rectifier circuit and operates as the power-transmission-side alternating-current voltage generating circuit, and the power-transmission-side alternating-current voltage generating circuit receives power from its output unit and operates as the power-reception-side rectifier circuit.

16. The wireless power-feeding apparatus according to claim 1, wherein mutual inductance is an equivalent magnetizing inductance generated due to magnetic field coupling formed between the power transmission coil and the power reception coil.

17. The wireless power-feeding apparatus according to claim 1, wherein the power-transmission-side resonance mechanism or the power-reception-side resonance mechanism includes an inductor, and the inductor is a leakage inductance component that is not involved in coupling in an inductance component of the power transmission coil or the power reception coil.

* * * * *